June 20, 1950

H. L. BURNS 2,511,834

AUTOMATIC CYCLING VALVE USED FOR
HYDRAULIC WINDSHIELD WIPERS

Filed May 2, 1949

INVENTOR.
HENRY L. BURNS

BY
Wade Koontz AND
Frederick W. Cotterman
ATTORNEYS

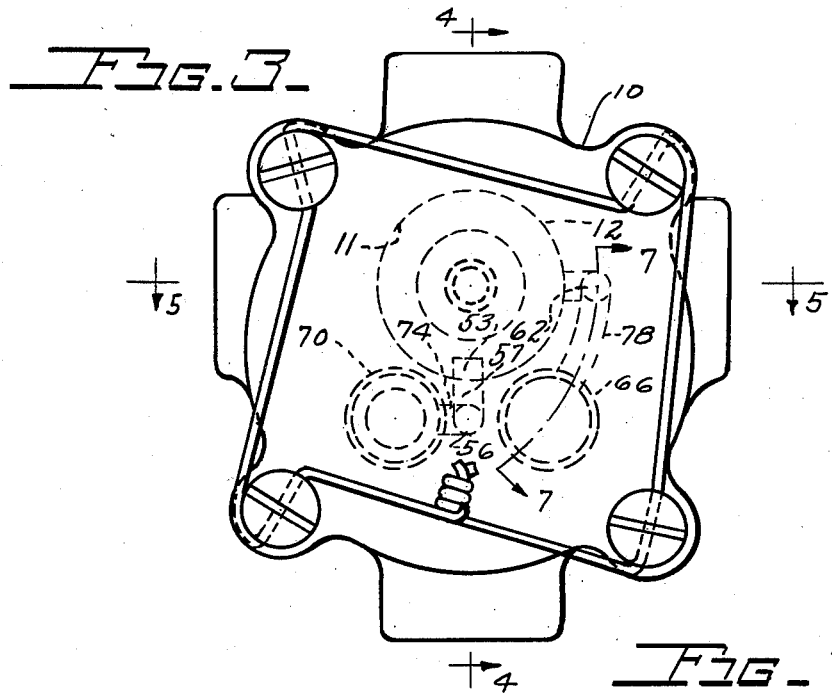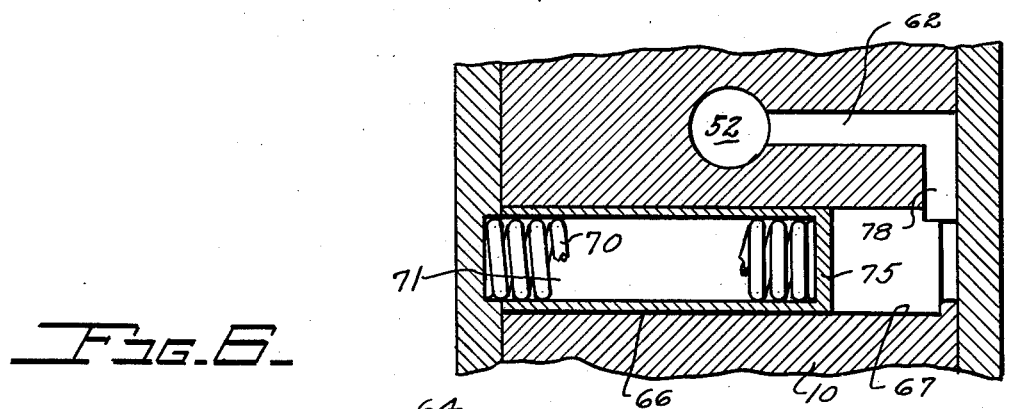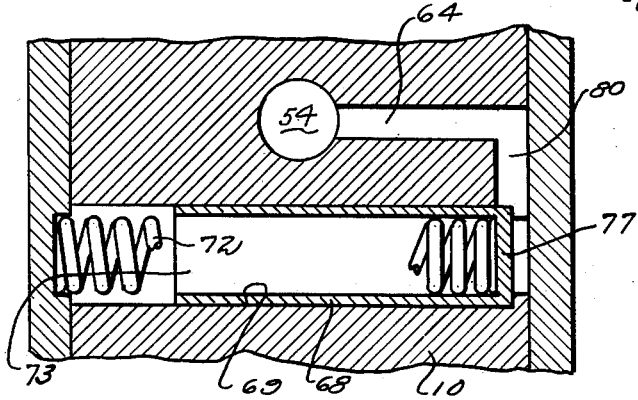

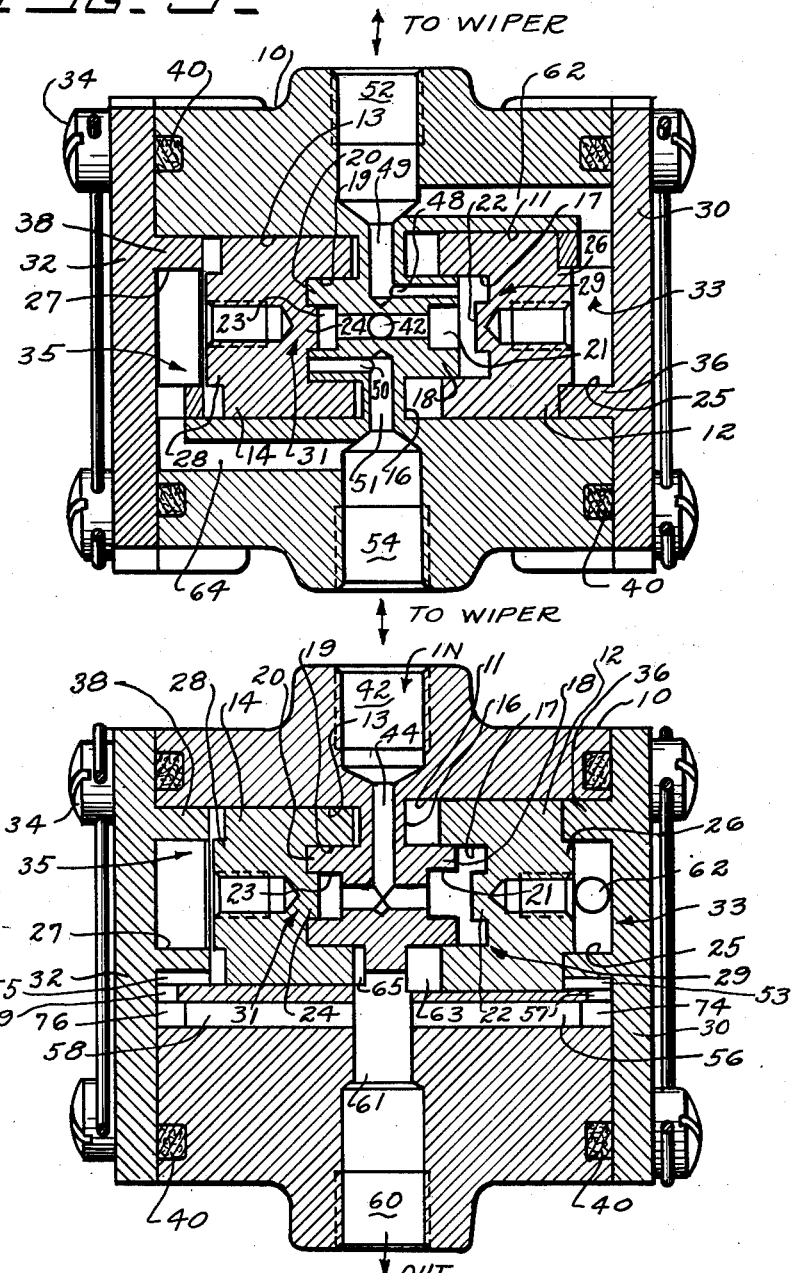

Patented June 20, 1950

2,511,834

UNITED STATES PATENT OFFICE 2,511,834

AUTOMATIC CYCLING VALVE USED FOR HYDRAULIC WINDSHIELD WIPERS

Henry L. Burns, Portland, Oreg.

Application May 2, 1949, Serial No. 90,982

9 Claims. (Cl. 121—147)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to a cycling valve for use in connection with a hydraulically operated windshield wiper, the present application being directed principally to improvements on a valve of similar construction heretofore shown and described in my copending application Serial No. 628,644, filed November 14, 1945.

The cycling valve herein disclosed is basically an automatic four-way valve which will alternately load and unload opposite sides of the piston-pinion rack assembly of a windshield wiper with a hydraulic fluid pressure.

An object of this invention is to improve the cycling characteristics of a valve of this character and especially to improve the cycling characteristics of the valve shown and described in my copending application, supra, whereby the valve when used to operate a windshield wiper will reciprocate the wiper alternately and always in opposite phase.

Another object of the invention is to provide means in the valve assembly to minimize the shock of reversal where the valve is employed to actuate a windshield wiper or other reciprocating device.

Another object is to so construct and arrange the several elements of a valve of this character as to greatly simplify the machining and assembling of the various detail parts.

Other objects and advantages will be recognized upon consideration of the following detailed description, reference being had to the drawings, wherein:

Figs. 2 and 3 are left and right-hand end views respectively of the completed valve.

Fig. 4 is an axial cross section taken at 4—4 of Figs. 2 or 3 showing some of the operative elements of the improved cycling valve.

Fig. 5 is an axial cross section taken at 5—5 of Fig. 3 through some of the operative elements of the valve.

Figs. 6 and 7 are fragmentary sections taken at 6—6 of Fig. 2 and at 7—7 of Fig. 3, respectively, showing the accumulator arrangement included in the valve for minimizing the shock of reversal of the device being operated by the valve.

Like reference characters refer to like parts throughout the several views.

Figure 2:
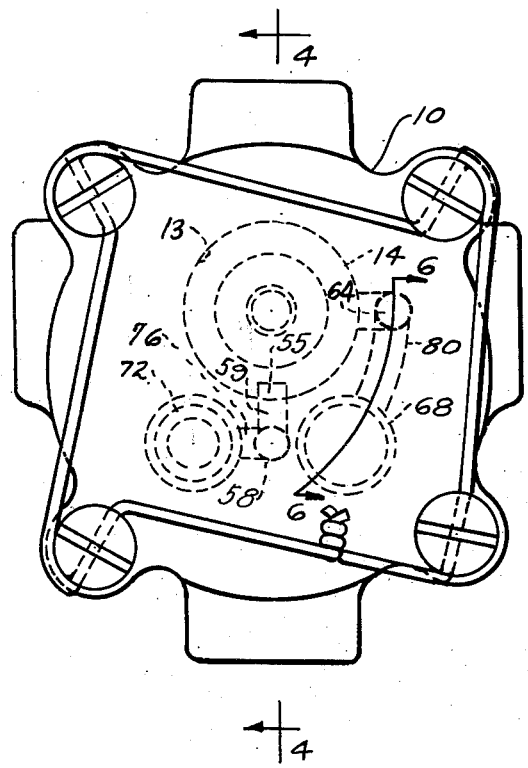

The embodiment of the invention herein disclosed essentially comprises a valve body containing two main pistons shiftable axially by fluid pressure acting on their end surfaces. Each main piston carries an inlet valve at one end and an outlet valve at the other, the valves being such that there is a greater area exposed to the piston-moving pressure on both inlet and outlet valves when they are open than when they are closed. It is also essential that the smallest pressure-exposed areas of the outlet valves are larger than the largest pressure-exposed areas on the inlet valves which prevents a stabilizing of the pressure in the system in which the device is used. The main pistons change their position whenever the system pressures build up or drop down to pressures which bear a predetermined relationship to the inlet and outlet fluid pressures to which the cycling valve is connected. Two main pistons are used in order that fluid pressures may be built up and released alternately in opposite phase on respective sides of a windshield wiper piston or other reciprocating device.

When the cycling valve is used with a noncompressible fluid in conjunction with a windshield wiper, the pressures which cause the valve to cycle are built up or drop off very rapidly at the instant flow is stopped due to said wiper assembly reaching the end of its stroke. In some cases this pressure change will occur in less time than is required to overcome the inertia to start the wiper assembly and main pistons in motion to create the opposite pressure phase. The present invention contemplates an improvement on the device of the copending application, supra, which consists of providing a pressure accumulating device whereby smoother reversal of the valve is achieved. An improvement over the device of the copending application, supra, consists in making the one main piston slightly larger than the other whereby cycling in opposite phase is assured.

In the drawing, the valve body 10 is bored from both ends as at 11 and 13 to slidably receive a large main piston 12 and a slightly smaller main piston 14. A partition 16 separates the two bores, and stationary pistons 18 and 20 extend oppositely from the partition, being formed thereon and preferably in one piece therewith.

The interfacing ends of the main pistons 12 and 14 are bored as at 17 and 19 to slidably receive the stationary pistons 18 and 20, respectively, and the stationary pistons 18 and 20 are in turn bored as at 21 and 23 to slidably receive the small pistons 22 and 24. Small pistons 22 and 24 are preferably an integral part of the main pistons 12 and 14 respectively. The bores 17 and 19, the pistons 18 and 20, the bores 21 and 23, and the pistons 22 and 24 may collectively be referred to as the inlet valves 29 and 31.

Formed on the outer ends of the main pistons 12 and 14 and preferably integral therewith are the short pistons 26 and 28 with short piston 28 being slightly larger. End heads 30 and 32, held to the body 10 by screws 34 are dowelled to the body by annular pilots 36 and 38 which extend respectively into the large and small body bores 11 and 13 and are of a length to limit endwise movement of the pistons 12 and 14, the annular dowels 36 and 38 being bored as at 25 and 27 to slidably receive the short pistons 26 and 28. Gaskets 40 are provided to pressure seal the end heads 30 and 32.

A fluid pressure inflow passageway 42 extends inward through a radial passageway 44 which is midway of the walls of the partition 16 to the piston axis, then axially opposite into the bores 21 and 23 which receive the pistons 22 and 24.

Axially parallel openings 48 and 50 (see Fig. 5) extend lengthwise through the pistons 18 and 20 respectively and through radial passageways 49 and 51 into wiper operating passageways 52 and 54 respectively. Passageways 62 and 64 (see Figs. 2, 3 and 5) connect the outer ends of the main bores 11 and 13 and the end head bores 25 and 27, when the outlet valves are open, to the wiper operating passageways 52 and 54 respectively. Passageways 56 and 58 (see Fig. 4), by way of notches 53 and 55 in the dowels 36 and 38 and by way of notches 57 and 59 in the outer ends of the main bores 11 and 13, connect the outer ends of the main bores 11 and 13 and the end head bores 25 and 27, when the outlet valves are open, through the radial passageway 61 to the fluid pressure outlet passageway 60. The radial passageway 61 also connects the spaces 63 and 65 at the inner ends of the main pistons together, whereby both the spaces 63 and 65 are always joined to the low pressure side of the system.

Two hollow accumulator plungers 66 and 68 (see Figs. 6 and 7) are slidably fitted to appropriate bores 67 and 69 in the body 10 and provided with springs 70 and 72 which urge the plungers toward their closed ends, one plunger being urged opposite the other. The open ends 71 and 73 of the plungers 66 and 68 are connected by passageways 74 and 76 (see Figs. 2, 3 and 4) through the passageways 56, 58 and 61 (see Fig. 4) to the fluid outlet 60. The closed ends 75 and 77 of the plungers 66 and 68 are connected by passageways 78 and 80 through passageways 62 and 64 to wiper operating passageways 52 and 54.

Figure 1:
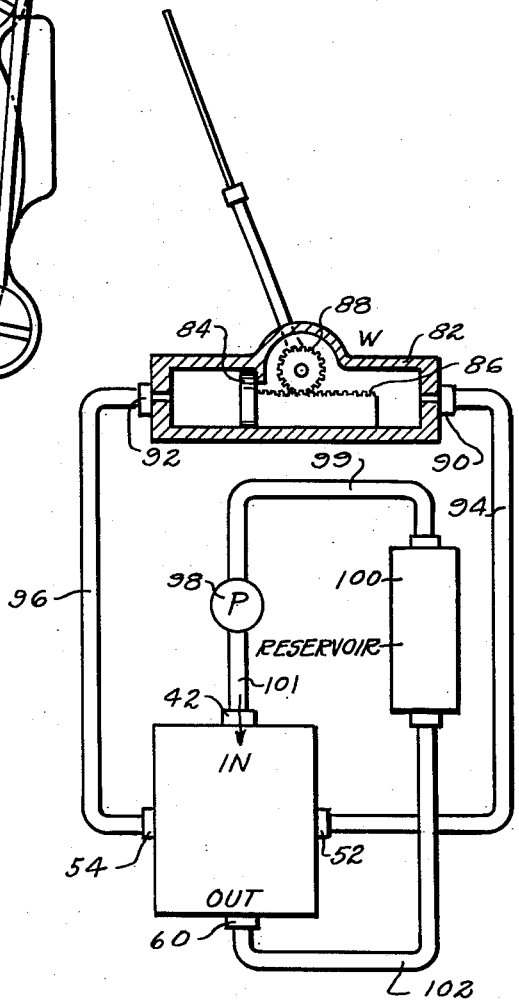
Fig. 1 is a schematic view of a windshield wiper assembly which includes the improved cycling valve which is the subject of this application.

Fig. 1 shows diagrammatically the valve mechanism which is the subject of this invention assembled with a windshield wiper of the piston, rack and pinion type. The wiper comprises a housing 82 with a piston 84 attached to a rack 86 in which a pinion 88 is meshed. Opposite points on the housing have openings 90 and 92 from which pipes 94 and 96 extend to the valve connections 52 and 54.

A pump 98 takes hydraulic fluid from a reservoir 100 through a pipe 99 and delivers it under suitable pressure through a pipe 101 to the inlet opening 42 of the valve mechanism. A pipe 102 extends from the outlet opening 60 of the valve mechanism back to the reservoir 100. The right-hand half of the valve mechanism, as seen in Figs. 4 and 5, contains the larger of the two main pistons. Figs. 4 and 5 also show the inlet valve of the right half open and the inlet valve of the left half closed.

The operation of the valve mechanism as assembled with the windshield wiper shown may be substantially as follows:

When the pump 98, or any other suitable source of hydraulic fluid under pressure, delivers fluid to the fluid inlet 42 it flows radially through passageway 44 then axially into bores 21 and 23, and since the small piston 22 is now already withdrawn from the bore 21 thereby opening the inlet valve 29, the fluid flows into the bore 17, (see Figs. 4 and 5), axially through the passageway 48 into the radial passageway 49 and flows to the wiper through the wiper operating passageway 52 and transmits its pressure to bore 25 through the passageway 62 (see Fig. 5), and from the passageway 62 through the passageway 78 (see Fig. 3) to the closed end of the plunger 66.

When inflow has continued for a sufficient period to move the wiper piston 84 to the left end of its stroke and to appropriately compress the plunger spring 70, the pressure will build up until the same p. s. i. exists in the bore 25 as in the bore 17. The pressure exposed area of the end of the piston 26, however, exceeds the pressure exposed area of the bottom of bore 17, and the main piston 12 will accordingly shift to the left, thereby entering the piston 22 into its bore 21 thereby closing the inlet valve 29 and arresting further inflow, while at the same time opening the outlet valve 33 by withdrawing the piston 26 from its bore 25, thereby opening the passageway between the end of the piston 26 and its bore 25, whereby the fluid exerts its pressure over the entire area of the outer end of the main piston 12 to momentarily hold the inlet valve 29 in closed position and the outlet valve 33 in open position so that fluid to the right of the wiper piston 84 may be returned through pipe 94, openings 52 and 62 to bore 25. From the bore 25 both the fluid being returned from the wiper and that returned from the accumulator plunger 66 pass through the passageways 53, 57, 56, 61 and 60 and the pipe 102 back to the reservoir 100. This completes one cycle.

The time required for the cycle just described will depend on the rate at which the pressure source delivers fluid through passageway 44 to the inlet valve and the rate at which the pressure on the right-hand end of the main piston 12 is relieved through the passageways 56, 61 and 60 and pipe 102. This may be controlled through a judicious proportioning of the passageway 56.

With the exception that the main piston 12 is slightly larger than the main piston 14, the left-hand half of the valve mechanism is like the right-hand half, and, although the two halves may start in synchronism, the fact that the pressure exposed area of the outer end of the piston 12 is larger than the pressure exposed area of the outer end of the piston 14 causes the piston 12 to hold the outlet valve 33 open longer each stroke until opposite phase is achieved.

Making the main piston 12 slightly larger than the main piston 14 and valve 33 slightly smaller than valve 35 produces slightly higher maximum and lower minimum cycling pressures on one side of the wiper piston 84 than on the other, whereby, even though the main pistons 12 and 14 start cycling in exactly the same phase, there will be a tendency for said wiper piston 84 to move, and any movement and accompanying flow of the fluid will move said main pistons 12 and 14 out of phase, and will continue to do so with each cycle until they are in exactly opposite phase. The maximum cycling pressure is a function of the ratio of areas of open position of the inlet valves 29 and 31 to the closed position of the outlet valves 33 and 35. The minimum cycling pressure is a function of the ratio of areas of closed position of the inlet valves 29 and 31 to the open position of the outlet valves 33 and 35. The cycling valve improvement, whereby one main piston 12 is larger than the other 14, provides a larger outlet valve 33 open position area and a smaller outlet valve 33 closed position area on the large main piston 12 than on the smaller main piston 14. The pressure exposed areas on both inlet valves 29 and 31 are the same, thereby allowing said different outlet valve 29 and 31 areas to produce the desired differences in cycling pressures which will always work said main pistons 12 and 14 into opposite phase.

With respect to the benefits derived from the addition of the accumulator pistons 66 and 68 and associated parts it was found that when wiper system pressures start to change rapidly as the wiper piston reaches the end of its stroke, one or the other of the accumulator assemblies will collapse, thereby causing a change in the system volume which in turn will delay cycling pressure build-up until sufficient time has elapsed for said wiper piston 84 to change its direction. Since it is desired to have this pressure build-up delay at the moment the wiper piston 84 reaches the end of its stroke, it is necessary to provide springs 70 and 72 of such strength as will not yield to pressures which are lower than required to produce the desired torque on the windshield wiper blade. Also, in order that the inertia of the accumulator will not overlap that of the wiper piston the accumulator must start to collapse at a pressure somewhat lower than the cycling pressure of the system.

Having described my invention, I claim:

1. For operating a fluid actuated reciprocable device, a valve mechanism comprising a body, two valve operating members movable in said body, an inlet and an outlet valve associated with each said valve operating member, said valve operating members each including operating surfaces exposable to a fluid under pressure for opening and closing said valves, the said exposed areas being larger when the valves are open than when the valves are closed, the pressure exposed areas of the outlet valves being larger when closed than the pressure exposed areas of the inlet valves when open, and the pressure exposed area at the outlet end of one valve operating member being greater than the pressure exposed area at the outlet end of the other valve operating member when the outlet valves are open, a fluid inlet connection, a fluid outlet connection, and two reciprocable-device operating connections in said body, and passageways extending from the fluid inlet connection through the inlet valves when the inlet valves are open to one of the said reciprocable-device operating connections, and from the other of the said reciprocable-device operating connections through the outlet valves when the outlet valves are open to the fluid outlet connection.

2. The mechanism of claim 1 with two accumulator plungers slidable in a bore in said body, passageways connecting the space at the one end of each plunger to the fluid outlet connection, and passageways connecting the space at the other end of each plunger to the pressure exposed surface of the outlet valve, and resilient means urging said plungers toward the space at the said other end.

3. For operating a fluid actuated reciprocable device, a valve mechanism comprising a body, two valve operating members movable in said body, an inlet and an outlet valve associated with each said valve operating member, said valve operating members each including operating surfaces exposable to a fluid under pressure for opening and closing said valves, the said exposable areas being larger when the valves are open than when the valves are closed, the pressure exposed areas of the outlet valves being larger when the outlet valves are closed than the pressure exposed areas of the inlet valves when the inlet valves are open, a fluid inlet connection, a fluid outlet connection, and two reciprocable-device operating connections in said body, and passageways extending from the fluid inlet connection through the inlet valves when the inlet valves are open to one of the said reciprocable-device operating connections, and from the other of the said reciprocable-device operating connections through the outlet valves when the outlet valves are open to the fluid outlet connection, two accumulator plungers slidable in said body, passageways connecting the spaces at the one end of the plungers to the fluid outlet connection, and passageways connecting the spaced at the other end of the plungers to the pressure exposed surfaces of the outlet valves, and resilient means urging said plungers toward the spaces at the said other end.

4. For operating a fluid actuated reciprocable device, a valve mechanism comprising a body, two pistons movable in said body, an inlet and an outlet valve associated with each said piston, said pistons each including end surfaces exposable to a fluid under pressure for moving said pistons for opening said valves, the said exposed areas being larger when the valves are open than when the valves are closed, the pressure exposed areas of the outlet valves being larger when closed than the pressure exposed areas of the inlet valves when open, and the pressure exposed area at the outlet end of one member being greater than the pressure exposed area at the outlet end of the other member when the outlet valves are open, a fluid inlet connection, a fluid outlet connection, and two reciprocable-device operating connections in said body, and passageways extending from the fluid inlet connection through the inlet valves when open to one of the said reciprocable-device operating connections, and from the other of the said reciprocable-device operating connections through the outlet valves when open to the fluid outlet connection.

5. For operating a fluid actuated windshield wiper, a valve mechanism comprising a body, two valve operating pistons movable in said body, an inlet and an outlet valve one on each end of each of said valve operating pistons, said valve operating pistons each including operating surfaces on the ends exposable to a fluid under pressure for opening said valves, the said pressure exposed areas being larger when the valves are closed, the pressure exposed areas on the outlet ends of the pistons being larger when the outlet valves are closed than the pressure exposed areas on the inlet ends of the pistons when the inlet valves are open, and the pressure exposed area at the outlet end of one piston being great than the pressure exposed area at the outlet end of the other piston when the outlet valves are open, a fluid inlet connection, a fluid outlet connection, and two windshield wiper operating connections in said body and passageways extending from the fluid inlet connection through the inlet valves when open to one of the said windshield wiper operating connections, and from the said other windshield wiper operating connection through the outlet valves when open to the fluid outlet connection.

6. The mechanism of claim 5 with two accumulator plungers slidable in said body, passageways connecting the space at the one end of each plunger to the fluid outlet connection, and passageways connecting the spaces at the other end of each plunger to the pressure exposed surfaces of one of the outlet valves, and a spring urging said plungers toward the spaces at the said other end.

7. For operating a fluid actuated windshield wiper, a valve mechanism comprising a body, two coaxial valve operating pistons slidable endwise in said body, an inlet and an outlet valve carried on opposite ends of each said valve operating piston, said valve operating pistons each including operating surfaces on their ends exposable to a fluid under pressure for opening said valves, the said exposed areas being larger when the valves are open than when the valves are closed, the pressure exposed areas of the pistons at the outlet ends being larger when the outlet valves are closed than the pressure exposed areas of the pistons at the inlet ends when the inlet valves are open, a fluid inlet connection, a fluid outlet connection, and two windshield wiper operating connections in said body, and passageways extending from the fluid inlet connection to the inlet valves, and, when the inlet valves are open, to one of the windshield wiper operating connections, and from the other of the said windshield wiper operating connections through the outlet valves when the outlet valves are open to the fluid outlet connection, two hollow accumulator plungers slidable in said body; one end of said plungers being open and the other end closed, passageways connecting the spaces at the open end of the plungers to the fluid outlet connection, and passageways connecting the spaces at the closed end of the plungers to the pressure exposed surfaces of the outlet valves, and spring means urging said plungers toward the spaces at the said closed end.

8. For operating a piston-rack-pinion type of windshield wiper, a cycling valve mechanism comprising a valve body, two coaxial main pistons slidable in bores in said body, the one main piston being slightly larger than the other cover members attached to said housing for closing the outer ends of said body bores, a partition midway of the length of said body bores dividing the larger body bore from the smaller, two inlet valves each comprising a fixed inlet-valve-operating piston extending axially from said partition, the main pistons being bored part way through to slidably receive the fixed inlet-valve-operating pistons, two movable inlet-valve-operating pistons extending inwardly from said main pistons, the fixed inlet valve operating pistons being bored to slidably receive said movable inlet-valve-operating pistons, and two outlet valves each comprising an outlet valve operating piston extending outwardly from the ends of the main pistons slidable in bores in said cover members, the stroke of said main pistons being such that the fixed inlet valve operating pistons may not be withdrawn from their bores, and such that when said outlet-valve-operating pistons are fully inserted in their bores, said movable inlet-valve-operating pistons are fully withdrawn from their bores and when said movable inlet valve operating pistons are fully inserted in their bores, said outlet-valve-operating pistons are fully withdrawn from their bores, and the areas of the ends of the outlet-valve-operating pistons is greater than the areas of the ends of the fixed inlet valve operating pistons, a fluid inlet connection, a fluid outlet connection, and two wiper operating connections in said body, and passageways extending from the fluid inlet connection through the inlet valves when the inlet valves are open to one of said wiper operating connections, and from the other of said wiper operating connections through the outlet valves when the outlet valves are open to the fluid outlet connection.

9. The mechanism of claim 8 with two hollow accumulator plungers closed at one end and axially parallel with the main pistons and slidable in said body, passageways connecting the space at the open end of each plunger to the fluid outlet connection, and passageways connecting the space at the closed end of each plunger to the pressure exposed surfaces of the outlet valves, and a spring urging said plungers toward the spaces at the said closed ends.

HENRY L. BURNS.

No references cited.